United States Patent [19]
Woodings et al.

[11] Patent Number: 5,169,256
[45] Date of Patent: Dec. 8, 1992

[54] HAND CONNECT-DISCONNECT COUPLING FOR BLAST FURNACE TAP HOLE DRILL ROD ASSEMBLY

[75] Inventors: Robert T. Woodings, Pittsburgh; Ronald J. Mathews, Valencia, both of Pa.

[73] Assignee: Woodings Industrial Corporation, Mars, Pa.

[21] Appl. No.: 603,602

[22] Filed: Oct. 26, 1990

[51] Int. Cl.$^5$ ................................................ F16D 1/00
[52] U.S. Cl. ...................................... 403/24; 403/343; 285/390
[58] Field of Search ................. 403/343, 307, 24; 285/390

[56] References Cited

U.S. PATENT DOCUMENTS

| | | | |
|---|---|---|---|
| 1,642,183 | 9/1927 | Thurston | 403/307 |
| 2,052,019 | 8/1936 | Baker | 403/343 |
| 3,258,284 | 6/1966 | Phipps | 285/390 X |
| 3,586,353 | 6/1971 | Lorenz | 285/390 X |
| 4,295,751 | 10/1981 | Holmberg | 285/390 X |
| 4,687,368 | 8/1987 | Eklof et al. | 403/343 |

OTHER PUBLICATIONS

"Brunner & Lay, Inc. Timken Rock Bit Division Percussion Rock Bits", Brunner and Lay, Inc. Form 022, p. 12.

Print of Brunner & Lay, Inc. drawing showing parameters for machining trapezoidal threads on a 1.5 inch drill rod.

*Primary Examiner*—Andrew V. Kundrat
*Attorney, Agent, or Firm*—Forest C. Sexton

[57] ABSTRACT

The component parts of a drill rod assembly on a blast furnace tap hole drill are joined together by providing a unique threaded coupling in which the threads do not torque tightly against each other but maintain a loose, floating relationship to thereby permit the coupling to be threaded together by hand without the use of a wrench, and such that the drilling action of the percussion drill will maintain the components in a joined relationship.

15 Claims, 2 Drawing Sheets

HAND CONNECT-DISCONNECT COUPLING FOR BLAST FURNACE TAP HOLE DRILL ROD ASSEMBLY

BACKGROUND OF THE INVENTION

1. Field of the Invention

The present invention relates to the art of opening blast furnace tap holes and to blast furnace tap hole drills, and more particularly to a unique quick connect-disconnect threaded coupling for use within the drill rod assembly which will not only permit a quick connection and disconnection of the drill rod components but will also permit the coupling and uncoupling to be quickly performed by hand without the need for a wrench or wrenches. The coupling of this invention will also prolong the useful life of the components connected thereto and will even provide a self-connecting and disconnecting capability upon proper activation of the tap hole drill.

2. Summary of the Prior Art

It is well known that the hearth of an iron blast furnace is provided with a tap hole, commonly referred to as an "iron notch" through which molten iron, usually referred to as "hot metal", is drawn off at periodic intervals during the blast furnace campaign. During a normal campaign, such tapping must be done on an average of five to twelve times daily as the blast furnace hearth becomes filled with molten iron and slag. After the blast furnace has been tapped; i.e., the molten hot metal and slag drained therefrom, the tap hole or iron notch is plugged with clay or "mud" which will harden and seal the tap hole until the next time the blast furnace is tapped.

In accordance with usual practices, a special drill is utilized to open a tap hole; i.e., drill a passageway through the hardened clay plugging the iron notch for the purposes of tapping the blast furnace. Such blast furnace tap hole drills are normally pneumatically or hydraulically operated rotary percussion drills comparable to the rock drills utilized in the mining industry. Such drills impart both a rotary and an impact force on an elongated drill rod having a rock drill bit at the end towards the iron notch.

The base support for the blast furnace tap hole drill is normally secured to the floor, a structural column, or some solid base structure and is provided with suitable linkage members and remote controls so that the blast furnace tap hole drill can be remotely operated from a safe distance. Pursuant to such a remote operation, the tap hole drill is operated to move the drill into the proper position for drilling the tap hole, then operated to drill the tap hole, and thereafter, moved back away from the tap hole and heat of the emerging hot metal, where the drill can be serviced and prepared for the next tap.

To prepare the blast furnace tap hole drill for each succeeding tap, it is always necessary to replace the drill bit, if not the drill rod or a portion thereof. This is because the temperature of the blast furnace hot metal, being about 2700°-2800° F., severely erodes the drill bit after it drills through the clay plug and enters the bath of molten hot metal. In addition, once the tap hole is drilled, the ferrostatic head of hot metal within the blast furnace will cause the hot metal to emerge through the tap hole around the drill bit and drill rod before the drill rod and bit can be withdrawn from the tap hole. Often times, the drill bit will not only be severely eroded but the portion remaining will virtually be "welded" or "galleded" to the end of the drill rod to which it had previously been removably attached. In such an event, it will be impossible to remove the drill bit from the drill rod to replace a new drill bit; and accordingly, it then becomes necessary to replace the entire drill bit and adjoining drill rod or drill rod component to which it is welded or galleded.

To reduce the expense of replacing the entire drill rod and bit assembly, it has become common practice to utilize a drill rod extension, which is merely a removable end portion of the drill rod, typically from 18 to 30 inches in length, fitted between the elongated rearward portion of the drill rod and the drill bit. Therefore, when the drill bit becomes welded or galleded to the drill rod extension bar, or the extension bar otherwise damaged, the bit and extension bar can be replaced without the need for replacing the entire drill rod assembly.

While in some situations it may be possible to remove one drill rod component from another, such as an extension bar from a drill rod, it often happens that the threaded portions are damaged and not reusable once separation is achieved. This is because the threaded portions of the extension bar and drill rod, but for the drill bit itself, are perhaps the surfaces most vulnerable to damage as a result of the heat to which the thin threads are exposed, in combination with the wrench imposed torque stresses on the threads, which may virtually strip or otherwise damage the threads sufficiently to render them useless.

It has long been appreciated that the use of more robust threading will render the threads less susceptible to damage. In fact, conventional rock drilling drill rod assemblies are normally provided with one or another of the well known heavy threadings; i.e., rope threads, trapezoidal threads, double entry threads, and Hi-Leed threads. All these well known threads provide a rather heavy thread section to better withstand the rotary and impact forces to which they are subjected. Since these specialized threads must normally be machined into the drill rods by the manufacturer, they are naturally more expensive than those having conventional pipe threading. Their added cost appears to be justified, in so far as conventional rock drills are concerned, in adding significantly to the life of the drill rods.

While it is also known to utilize the above-noted heavy threads in blast furnace tap hole drill rod assemblies, the use of conventional pipe threads is far more common with regard to blast furnace tap hole drills. This is because the average useful life of drill rods used in a blast furnace tap hole drill is quite short regardless of the threads used, so that the added cost is not normally justified. Indeed, blast furnace tap hole drill rods are often damaged and in need of replacement for reasons other than damage to the threads, such as being welded to the extension bar, for example. Therefore, because blast furnace tap hole drill rods are in the nature of a consumable item, as compared to rock drill rods, the use of conventional pipe threading is usually preferred.

In addition to the above problems associated with efforts to salvage as much of the drill rod assembly as possible for reuse as a means of cost savings, it should be appreciated that the manual task of preparing the tap hole drill for each succeeding tap is a most unpleasant one and does expose the workers; i.e., the tap crew making the repairs, to a hazardous environment. The environment in which the tap crew must work to replace the damaged drill rod assembly components is, of course, reasonably close to the blast furnace, which has an interior temperature well in excess of 3,000° F. Also, the atmosphere adjacent to the blast furnace is far from pleasant, as it usually contains noxious gases that manage to escape from the furnace. In addition, the site is usually adjacent to the runner through which the blast furnace had just been tapped. This runner, consisting of a fire-brick lined trough usually built into the floor adjacent to the furnace, will retain an excessive amount of heat for a rather long period of time after the hot metal has been tapped. Obviously, the tap hole drill rod assembly components themselves will also retain an exceptional amount of heat, and will be too hot to handle without protective gloves and additional protective clothing. Therefore, the tap crew is always anxious to prepare the tap hole drill rod assembly as quickly as possible in an effort to spend as little time as possible in the rather unpleasant atmosphere in which they must work. Because of the heat to which the drill rod components were subjected, however, it often happens that the thread connections are very tightly bonded together, often requiring three or four men with pipe wrenches working a considerable amount of time to disconnect a coupling. This is true for the heavy rock drill threaded connections (as noted above) as well as those utilizing conventional pipe threads.

While it would be helpful to delay the tap hole drill repair effort for a period of several hours to permit the site and drill rod components to cool more significantly, this is not possible because the tap-to-tap period may be as short as two hours. Therefore, it is deemed essential that the tap hole drill be prepared for the next tap as soon as the work can be achieved to assure that the drill will be ready for use when the furnace is ready to be tapped. Indeed, any delay in tapping the furnace after it is ready to be tapped will constitute a very costly delay to the overall operation of the facility by reducing blast furnace yield.

SUMMARY OF THE INVENTION

This invention is predicated upon the conception and development of a unique connection or coupling for attaching the drill rod assembly components together, and particularly for joining an extension bar to a drill rod which is not based on conventional rock drill threaded, machine screw threaded, or pipe threaded interconnections, but rather a unique new threaded connection which can be connected and disconnected by hand without the need for any wrenches, and is, therefore, quicker to thread on and off. Besides the above primary objective of this invention, the unique new coupling is far less likely to stick, is less vulnerable to damage, and will even be self-threading and unthreading upon proper activation of the tap hole drill Accordingly, the use of threaded connections in accordance with this invention will greatly benefit the tap crew by making it possible to prepare the tap hole drill much quicker after a tapping operation, and by minimizing the amount of time spent at that unpleasant task.

DETAILED DESCRIPTION OF THE INVENTION

Figure 3:
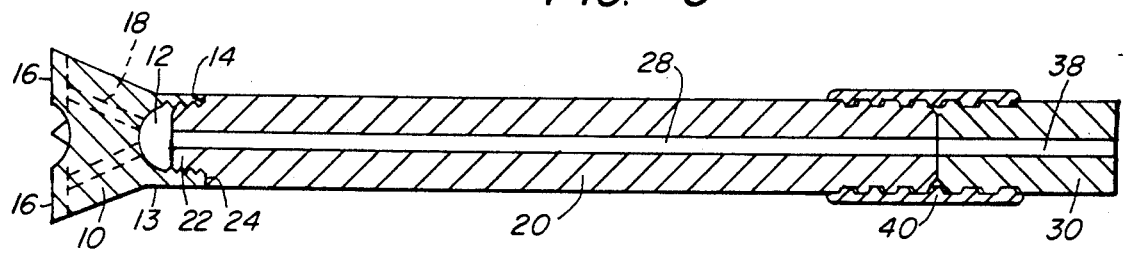
FIG. 3 is a cross-sectional side view illustrating a conventional drill rod assembly utilizing a sleeve-type coupling between the extension bar and drill rod according to this invention.

Reference to FIG. 3 will illustrate a typical technique for interconnecting the drill rod assembly wherein a drill bit 10 is connected to an extension bar 20, and extension bar 20 is connected to a drill rod 30. The drill rod 30 is connected to the rotary-percussion head of a percussion drill (not shown). As shown in FIG. 3, the coupling between the extension bar 20 and drill rod 30 utilizes a sleeve-type coupling 40 pursuant to this invention. While it is recognized that the drill bit 10 can be directly attached to the drill rod 30 without utilizing a removable extension bar 20, such practice has become rather rare.

As can be seen in FIG. 3, one end of the extension bar 20 is provided with a threaded extension head portion 22 which mates with the threaded pilot hole 12 in the shank 13 of drill bit 10. The threaded portion of pilot hole 12 is deeper than the length of threaded head portion 22 so that the annular edge rim 14 on shank 13 will tighten against shoulder 24 on extension bar 20 to tightly secure drill bit 10 onto extension bar 20.

As can further be seen from FIG. 3, the drill rod 30 and extension bar 20 are each provided with a port 38 and 28 respectively through their axis for the purpose of injecting air during the drilling operation. This injected air passes through ports 18 in the drill bit 10, which emerges between the cutting tips 16 of drill bit 10 to purge drilling debris from the drilling site.

Figure 1:
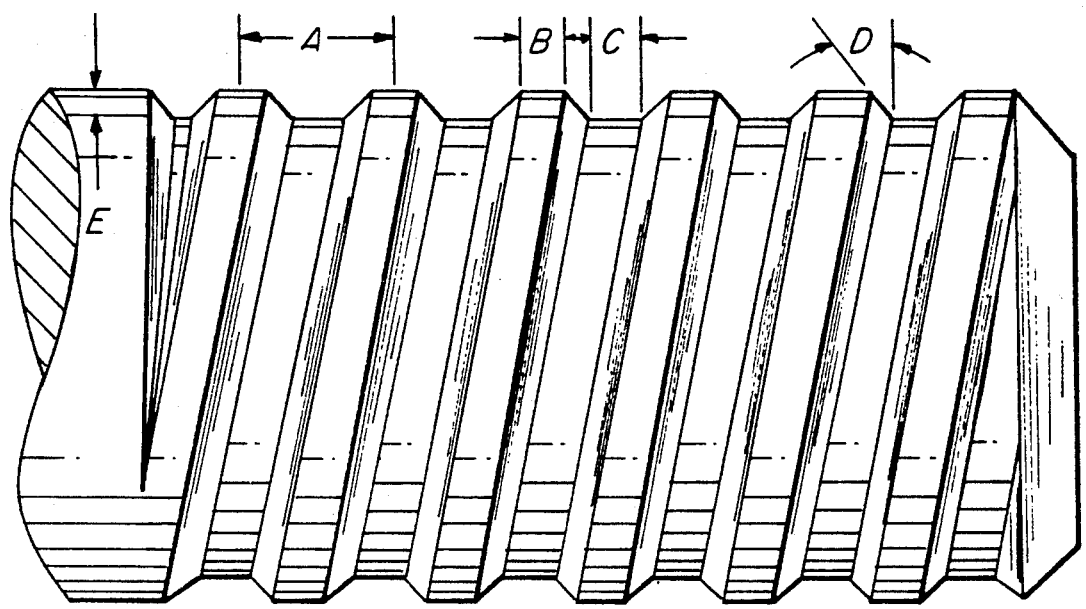
FIG. 1 is an enlarged side view of an end of a blast furnace tap hole drill rod assembly component such as a drill rod or an extension bar, the end of which is provided with male threads according to this invention.
Figure 2:
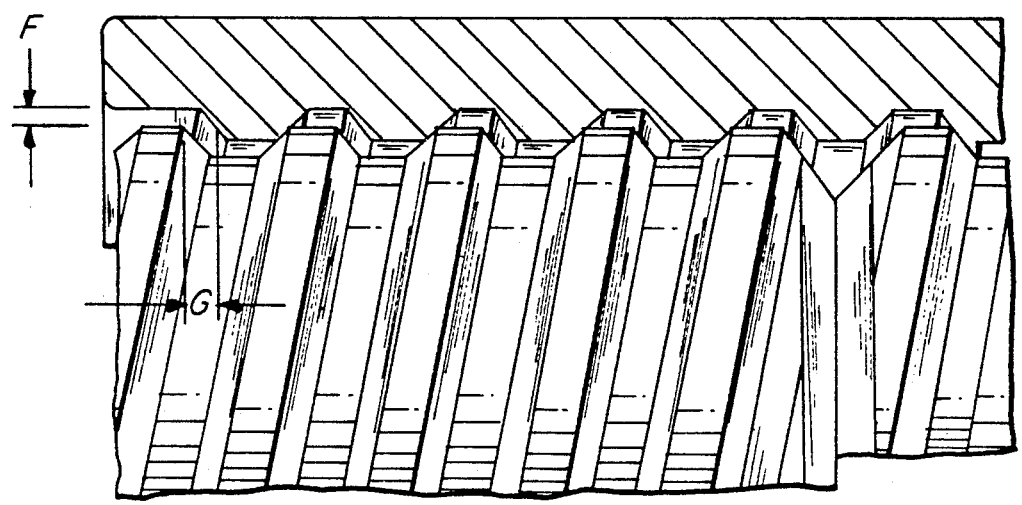
FIG. 2 is an enlarged partial cross-section through a typical coupling according to this invention illustrating both the male and female elements, with the female element shown in cross-section.

To secure extension bar 20 to drill rod 30, the customary practice has been to utilize conventional pipe threading tools; i.e., pipe threading taps and dies, to form the threaded interconnections, or else use the conventional rock drill threaded connections, as previously noted. The crux of this invention, however, is based on the use of a very unique thread design for connecting together any two or more of the drill rod assembly components which can easily be threaded and unthreaded by hand without the use of a wrench. Reference to FIG. 1 better illustrates the unique male thread of this invention as seen in side view, while FIG. 2 illustrates the interconnection between male and female components.

The thread parameters of this invention are as follows:

|  | General | Preferred | Ideal |
|---|---|---|---|
| Pitch (Lead) | 0.44–1.33 inch | 0.60–0.68 in. | 0.640 in. |
| Thread angle | 30–110° | 40–50° | 45° |
| Depth | 0.035–0.12 inch | 0.08–0.10 in. | 0.10 in. |

|  | General | Preferred | Ideal |
|---|---|---|---|
| Crest | 0.12–0.56 inch | 0.18–0.24 in. | 0.22 in. |
| Root | 0.12–0.56 inch | 0.18–0.24 in. | 0.22 in. |
| Threads per inch | 0.75–2.25 | 1.5 to 1.6 | 1.562 |

In addition, the thread roots and crests are preferably rounded to a radius of from 0.03 to 0.30 inch. Since only a single screw thread is provided, the lead will always be equal to the pitch. As shown in FIG. 1, the thread pitch or lead is represented by the dimension A, the thread crest is represented by the dimension B, the thread root is represented by the dimension C, the thread angle is represented by the dimension D, and the thread height is represented by the dimension E. As is typical of blast furnace tap hole drills, the threading is left-handed because of the counter-clockwise impacting rotation of the percussion drill.

The female thread parameters are the same as the male thread parameters listed above, and any female threads should have essentially the same parameters as that of the male head to which it is threaded so that the pitch, thread angle, thread depth, thread width, and thread root are identical with regard to mating male and female components to be threaded together. A typical threaded interface is illustrated in FIG. 2.

As in any threaded joint, there must be a clearance or tolerance between the male and female interfaces. In the coupling of this invention, the diameter of the female socket must of course be sufficiently larger than the mating diameters of the male heads to permit the components to be joined by hand, which will require a clearance significantly larger than usual. On the other hand, the clearance must of course be less than the depth of the thread so that the abutting threads will engage each other. For most practical applications, the clearance is preferably from about 0.010 to 0.015 inch. Any clearances less than 0.010 inch may cause binding of the coupling, making them difficult to thread by hand or incapable of being automatically tightened and disconnected by the drill itself. Clearances greater that 0.015 inch may cause the threads to be too loose fitting, causing the crests to over-ride one another as a result of the impacting forces, thereby causing the interfaces to be locked together. The clearance dimension is illustrated in FIG. 2 as dimension F.

By virtue of the rather significant diametric clearances and the fact that the adjoining threads are the same size, a rather significant axial clearance will naturally result, as can clearly be seen in FIG. 2, as represented by dimension G. In this regard, it should be noted that the interspaced threads will contact each other only at one side of the threads and not the other so that the mating threads cannot bound tightly together. In addition, each thread crest will normally be spaced away from the adjacent root of the mating component by a distance equal to the above noted clearance F.

It should be further noted that the above thread parameters are not based on the size of the drill rod or extension bar and will function equally with any bar size from 1⅛ to 2¼ inch, which is the range of drill rod sizes normally utilized for blast furnace tap hole drill rods.

As previously noted, the above threaded couplings can easily be threaded together or unthreaded from each other by hand without the need for any wrenches. This ease in twisting results from the rather excessive clearance noted above, as well as the fact that inventive threads utilize a rather significant lead in combination with a rather open thread angle.

Because of the exceptionally loose fitting interfaces noted above, the interlocking threads do not in fact bind tightly against each other with any significant torque, and accordingly do not tightly engage interconnected components. For this reason, it is essential that any two components joined together with a threaded coupling according to this invention must be in an abutting face to face relationship so that the rotary and impacting forces of the percussion drill can be directly transmitted from one component to the adjoining component, and not transmitted through the thread interfaces. Accordingly, the threaded coupling can be more aptly described as a "floating" connection which serves primarily to hold the ends of the drill rod components in an abutting relationship without any significant interlocking at the threaded interfaces.

In view of the very loose fitting nature of the inventive coupling, an artisan could be lead to believe that the threaded coupling of this invention would not be sufficiently rigid to maintain the joined components together and withstand the rigors of the rotary and impact forces. It has been found, however, that because the threaded interfaces of the coupling are so loose fitting, the rotary and impact forces imposed on the drill rod assembly will literally cause the joined components to be threaded towards each other to maintain the essential abutting relationship. Therefore, even if the tap crew does not join the components together sufficiently to achieve the essential face-to-face abutting relationship, the drilling action of the percussion drill will in fact tighten the coupling to effect the required abutting relationship. Accordingly, all the tap crew needs to do is to manually make the connection, as the percussion drill will do the rest when it is activated by threading the component parts together and maintaining the abutting relationship. To this extent, therefore, the coupling of this invention is self-connecting. The coupling is indeed so loose fitting or "floating" that if the impact drill is equipped with a reversing rotation, the activation of the drill in a reverse rotation will virtually cause the coupling to unthread itself so that the component on the free end will virtually fall free of the drill rod to render the self-unthreading feature. Accordingly, the threaded connections are so loose, that the components are actually threaded together or threaded apart, depending on the rotation direction of the percussion drill.

It should be apparent, therefore, that the threaded coupling of this invention serves only the function of keeping the ends of the drill rod components aligned in an end-to-end relationship, while the percussion drill itself will maintain the tight abutting relationship as necessary to achieve the rotary and impact forces on the drill bit.

As previously noted, the threads of the prior art couplings are susceptible to damage by virtue of the fact that the threads themselves are subjected to very high torque stresses as a result of the wrench tightened connection, in combination with the exceptionally high temperatures to which they are subjected in the vicinity of a blast furnace tap hole. These combined forces will frequently cause the threads to be stripped or otherwise damaged even in situations where heavier rock drilling threads are used. By virtue of the fact that there is no significant binding torque stresses on the coupling threads of this invention, however, the threads will be significantly less susceptible to damage. Even when the threads of this invention are damaged to a significant extent without being actually stripped, the exceptionally loose fitting nature of the threads will normally allow the coupling to be reused, even when badly nicked, pitted, warped, etc.

Figure 4:
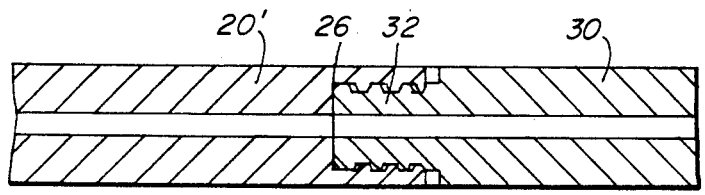
FIG. 4 illustrates another embodiment of this invention wherein an extension bar is connected directly to a drill rod in accordance with this invention without the use on an independent sleeve coupling.

While the above inventive coupling has been shown and described in connection with attaching an extension bar to a drill rod, it should be appreciated that the same threaded connection can be utilized as well to join the extension bar to the drill bit if so desired, and that other forms of affecting the threaded interconnection can be made. FIG. 4, for example, illustrates a coupling between an extension bar 20' and a drill rod 30 which does not require the use of a sleeve-type coupling. In this embodiment of the invention, one of the components must be provided with a threaded head 32; e.g., the drill rod 30 as shown in the drawing, while the other component is provided with a threaded socket 26 with the head 32 and socket 26 having mating threads in accordance with this invention. In utilizing a coupling as depicted in FIG. 4, the depth of socket 26 should be limited and its base flat to assure that the end surface of head 32 will abut against the base of the socket 26 so that the action of the percussion drill will be transmitted through the abutting interface and not the threads, as previously described.

Figure 5:
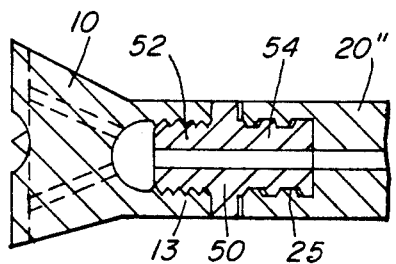
FIG. 5 illustrates another embodiment of this invention wherein a coupling device, having threads according to this invention, is utilized to connect a conventional drill bit to an extension bar.

Reference to FIG. 5 will illustrate still another embodiment where a special coupling device 50, according to this invention, is utilized to join a drill bit 10 to an extension bar 20''. In this embodiment a conventional drill bit 10 is utilized, as is commercially available from a number of sources. The coupling device 50 pursuant to this invention, is a short bar segment having a diameter equal to that of the extension bar 20'' and the shank 13 of drill bit 10. At one end of coupling device 50, a first threaded head 52 is provided having threads that will mate with the conventional threads within the shank 13 of drill bit 10. The other end of coupling device 50 is provided with a threaded head 54 having threads pursuant to this invention. Extension bar 20'' is, therefore, provided with a socket 25 having female threads as necessary to receive head 54 on coupling device 50. Here again, the end of head 54 should abut against the base of socket 25, as discussed above.

To describe the use of the coupling of this invention, it has already been noted that it is only essential that the components be generally joined together, and that the percussion drill will maintain the essential abutting relationship of the components during the drilling operation. Despite the loose fitting nature of the coupling, the components will, nevertheless, be adequately held together during the drilling operation. When the drilling operation is completed and the drill rod assembly withdrawn from the tap hole, the drill bit will normally be severely melted away and in need of replacement. Quite frequently, the extension bar too will also be in need of replacement by virtue of the fact that the end connected to the drill bit is often sufficiently damaged to prevent its reuse. The real advantages of this invention can be appreciated upon withdrawal of the drill bit from the blast furnace tap hole, in that one worker can easily remove any component joined together in accordance with this invention by hand, without the need of any wrenches.

The self-unthreading feature requires the use of a drill having a reverse rotational capability. In this application, the drill rod components can most usually be disconnected from each other automatically after withdrawal of the drill bit from the blast furnace tap hole by reversing the drill rotation in combination with the impacting action, and by permitting the components not welded or galled together to merely fall freely to the floor. The tap crew can thereafter thread on a new drill bit and extension bar combination with a simple turn or two by hand, and then pick up the previously used drill bit and extension bar from the floor and take it to a safer location where it can cool before being examined to determine salvageability.

In those situations where the extension bar will not unthread itself from the drill rod, a sharp blow or two with a hammer will usually be sufficient to loosen the connection, permitting self-unthreading or at least a quick unthreading by hand. Accordingly, the work effort to be performed at the drill site can be reduced from two or three men spending 10 to 20 minutes, to a single man spending less than two minutes.

It should be readily apparent that despite the fact that the threaded connections of this invention may be more expensive as compared to conventional pipe threaded couplings, the added cost is more than off-set by the significant speed with which the tap hole drill can be readied between taps, and the significant reduction of exposure of the tap crew to unpleasant and hazardous environments. In addition to these advantages, however, the threaded connections of this invention will be less susceptible to damage, even as compared to the heavy prior art threads used in conventional rock drilling.

In view of the several embodiments and variations of this invention as described above, it should be apparent that numerous other embodiments, variations, and modifications could be incorporated without departing from the spirit of the invention. In addition, practically any two or more of the above described embodiments can be combined to join different components of a drill rod assembly, whether for blast furnace tap hole drills or any drill where such advantages would be useful.

What is claimed is:

1. An elongated drill rod assembly for a percussion drill comprising a plurality of component parts coupled together, said component parts including at least a drill bit and a drill rod, at least two of said component parts coupled together by a threaded coupling, said coupling including a threaded head inserted within a threaded socket, said threaded coupling being sufficiently loose fitting to permit said components to be threaded and unthreaded by hand without the use of a wrench, and such that the drilling action of said percussion drill will maintain the components in a joined relationship, the threads of said head and said socket being substantially identical to each other and have a pitch of from 0.60 to 0.68 inch, a thread angle of from 40 to 50 degrees, a depth of from 0.08 to 0.10 inch, a thread width of from 0.18 to 0.24 inch, a thread root of from 0.18 to 0.24 inch, with from 1.5 to 1.6 threads per inch, and a diametric clearance of from 0.010 to 0.015 inch between said head and said socket.

2. A drill rod assembly according to claim 1 in which the thread roots and crests are rounded to a radius of from 0.03 to 0.30 inch.

3. A drill rod assembly according to claim 1 in which said threads have a pitch of about 0.640 inch, a thread angle of about 45 degrees, a depth of about 0.10 inch, a thread width of about 0.22, a thread root of about 0.22 inch, with about 1.56 threads per inch and a diametric clearance of about 0.010 inch between said head and socket.

4. A drill rod assembly according to claim 1 in which said two component parts coupled together comprise a drill rod and an extension bar.

5. A drill rod assembly component selected from the group consisting of a drill rod, an extension bar, a drill bit, and a connecting device, said component having a threaded head portion, said threaded head portion having a pitch of from 0.60 to 0.68 inch, a thread angle of from 40 to 50 degrees, a depth of from 0.08 to 0.10 inch, a thread width of from 0.18 to 0.24 inch, a thread root of from 0.18 to 0.24 inch, and from 1.5 to 1.6 threads per inch.

6. A drill rod assembly component according to claim 5 in which the thread roots and crests are rounded to a radius of from 0.03 to 0.30 inch.

7. A drill rod assembly component according to claim 5 in which said threads have a pitch of about 0.640 inch, a thread angle of about 45 degrees, a depth of about 0.10 inch, a thread width of about 0.22, a thread root of about 0.22 inch, and about 1.56 threads per inch.

8. A threaded coupling for joining components of a drill rod assembly to a percussion drill on a blast furnace tap hole drill, said coupling comprising a threaded head inserted within a threaded socket, the threads of said head and said socket being substantially identical to each other, said threaded coupling being sufficiently loose fitting to permit said components to be threaded and unthreaded by hand without the use of a wrench, and such that the drilling action of said percussion drill will maintain the components in a joined relationship, the threads of said threaded coupling having a pitch of from 0.60 to 0.68 inch, a thread angle of from 40 to 50 degrees, a depth of from 0.08 to 0.10 inch, a thread width of from 0.18 to 0.24 inch, a thread root of from 0.18 to 0.24 inch, with from 1.5 to 1.6 threads per inch, and a diametric clearance of from 0.010 to 0.015 inch between said head and said socket.

9. A threaded coupling according to claim 8 in which the thread roots and crests are rounded to a radius of from 0.03 to 0.30 inch.

10. A threaded coupling according to claim 8 in which said threads have a pitch of about 0.640 inch, a thread angle of about 45 degrees, a depth of about 0.10 inch, a thread width of about 0.22, a thread root of about 0.22 inch, and about 1.56 threads per inch, and a clearance of about 0.010 inch between said male and female members.

11. A threaded coupling according to claim 8 in which said components comprise a drill rod and an extension bar.

12. An blast furnace tap hole drill comprising a percussion drill attached to an elongated drill rod assembly, said drill rod assembly comprising a plurality of component parts coupled together, said component parts including at least a drill bit and a drill rod, at least two of said component parts coupled together by a threaded coupling, said coupling including a threaded head inserted within a threaded socket, the threads of said head and said socket being substantially identical to each other, said threaded coupling being sufficiently loose fitting to permit said components to be threaded and unthreaded by hand without the use of a wrench, and such that the drilling action of said percussion drill will maintain the components in a joined relationship, the threads of said threaded coupling have a pitch of from 0.60 to 0.68 inch, a thread angle of from 40 to 50 degrees, a depth of from 0.08 to 0.10 inch, a thread width of from 0.18 to 0.24 inch, a thread root of from 0.18 to 0.24 inch, with from 1.5 to 1.6 threads per inch, and a diametric clearance of from 0.010 to 0.015 inch between said head and said socket.

13. A blast furnace tap hole drill according to claim 12 in which the thread roots and crests are rounded to a radius of from 0.03 to 0.30 inch.

14. A blast furnace tap hole drill according to claim 12 in which said threads have a pitch of about 0.640 inch, a thread angle of about 45 degrees, a depth of about 0.10 inch, a thread width of about 0.22, a thread root of about 0.22 inch, with about 1.56 threads per inch and a diametric clearance of about 0.010 inch between said head and socket.

15. A blast furnace tap hole drill according to claim 12 in which said two said component parts coupled together comprise a drill rod and an extension bar.

* * * * *